US010720821B2

(12) United States Patent
Kelly

(10) Patent No.: US 10,720,821 B2
(45) Date of Patent: Jul. 21, 2020

(54) DIRECT DRIVE GENERATOR FOR RENEWABLE ENERGY APPLICATIONS

(71) Applicant: Greenspur Renewables Limited, London (GB)

(72) Inventor: Hugh-Peter Granville Kelly, Westcliff on Sea (GB)

(73) Assignee: TIME TO ACT LIMITED, Hatfield (GB)

( * ) Notice: Subject to any disclaimer, the term of this patent is extended or adjusted under 35 U.S.C. 154(b) by 75 days.

(21) Appl. No.: 15/038,290

(22) PCT Filed: Nov. 20, 2014

(86) PCT No.: PCT/GB2014/053436
§ 371 (c)(1),
(2) Date: May 20, 2016

(87) PCT Pub. No.: WO2015/075456
PCT Pub. Date: May 28, 2015

(65) Prior Publication Data
US 2016/0301289 A1    Oct. 13, 2016

(30) Foreign Application Priority Data
Nov. 21, 2013 (GB) .................... 1320623.0

(51) Int. Cl.
*H02K 21/24* (2006.01)
*F03D 15/20* (2016.01)
(Continued)

(52) U.S. Cl.
CPC ............. *H02K 21/24* (2013.01); *F03D 9/25* (2016.05); *F03D 15/20* (2016.05); *H02K 1/2793* (2013.01);
(Continued)

(58) Field of Classification Search
CPC .. H02K 1/00; H02K 1/06; H02K 3/00; H02K 3/04; H02K 3/28; H02K 3/47;
(Continued)

(56) References Cited

U.S. PATENT DOCUMENTS 3,407,320 A * 10/1968 McLean ................. H02K 5/132
310/114
3,992,641 A * 11/1976 Heinrich ............... H02K 19/103
310/114
(Continued)

FOREIGN PATENT DOCUMENTS

EP        2190107 A1     5/2010
EP        02190103       * 10/2010  ............... H02K 3/47
(Continued)

OTHER PUBLICATIONS

European Office Action dated Mar. 9, 2018 for EPO Application No. 14803205.5—Greenspur Renewables Limited. (European application corresponding to above referenced U.S. Appl. No. 15/038,290 for Greenspur Renewables Limited.).

*Primary Examiner* — Tran N Nguyen
(74) *Attorney, Agent, or Firm* — Hall Estill Attorneys at Law

(57) ABSTRACT

A direct drive rotary generator formed of an elongate cylindrical series of stator annuli and a coaxial elongate cylindrical series of armature annuli and mounted for relative rotational movement around their common axis, the series of stator annuli interleaving the series of armature annuli, and either of the armature/stator annuli having a contiguous or substantially contiguous sequence of coils around its circumference, and the other of the armature/stator annuli having a corresponding sequence of permanent magnets of alternating polarity spaced around its circumference and at the same pitch as that of the coils, the arrangement being such that lines of magnetic flux passing across the air gap
(Continued)

between one magnet carrying annulus to the next cut the turns of the coils of the corresponding interleaved coil carrying annulus, and thus induce in the coils electromagnetic forces as the armature is caused to rotate relative to the stator.

19 Claims, 13 Drawing Sheets

(51) Int. Cl.
| | |
|---|---|
| *H02K 1/27* | (2006.01) |
| *H02K 7/18* | (2006.01) |
| *F03D 9/25* | (2016.01) |
| *H02K 3/04* | (2006.01) |
| *H02K 3/28* | (2006.01) |

(52) U.S. Cl.
CPC ............... *H02K 3/04* (2013.01); *H02K 3/28* (2013.01); *H02K 7/1838* (2013.01); *F05B 2220/7066* (2013.01); *F05B 2220/7068* (2013.01); *Y02E 10/725* (2013.01)

(58) Field of Classification Search
CPC ...... H02K 1/2793; H02K 21/24; H02K 21/26; H02K 7/1838
USPC .................................. 310/267, 268, 112, 114
See application file for complete search history.

(56) References Cited

U.S. PATENT DOCUMENTS

| | | | | |
|---|---|---|---|---|
| 4,358,693 A | * | 11/1982 | Palmer .................. | H02K 25/00 310/112 |
| 4,371,801 A | * | 2/1983 | Richter .................. | H02K 21/24 310/156.36 |
| 4,529,902 A | * | 7/1985 | Lordo ...................... | H02K 1/17 310/112 |
| 4,996,457 A | * | 2/1991 | Hawsey ................ | H02K 21/24 310/112 |
| 5,334,899 A | | 8/1994 | Skybyk | |
| 5,982,074 A | * | 11/1999 | Smith ...................... | H02K 3/04 310/156.36 |
| 6,005,320 A | * | 12/1999 | Kim ........................ | H02K 21/24 310/114 |
| 6,037,696 A | * | 3/2000 | Sromin ................ | H02K 1/2793 310/112 |
| 6,353,276 B1 | * | 3/2002 | Gendron ................ | H02N 1/004 310/309 |
| 6,373,162 B1 | * | 4/2002 | Liang ................... | H02K 1/2793 310/112 |
| 2008/0231132 A1 | * | 9/2008 | Minowa ................ | H02K 16/00 310/114 |
| 2011/0042961 A1 | | 2/2011 | Van Breemen-Schneider | |
| 2011/0121576 A1 | * | 5/2011 | Bayko ..................... | F03D 3/005 290/55 |
| 2012/0038162 A1 | * | 2/2012 | Smith, Jr. .............. | H02K 7/183 290/52 |
| 2013/0249217 A1 | | 9/2013 | Yost | |

FOREIGN PATENT DOCUMENTS

| | | | |
|---|---|---|---|
| FR | 2639486 A1 | 5/1990 | |
| GB | 2382729 A | 6/2003 | |
| JP | 08-242557 A | 9/1996 | |
| JP | 2005151725 | * 6/2005 | ............... H02K 1/24 |
| JP | 2006087216 | * 3/2006 | ............... H02K 1/27 |
| JP | 2006345627 | * 12/2006 | ............... H02K 1/27 |
| JP | 2009033946 | * 2/2009 | ............... H02K 1/27 |
| KR | 1020070101885 A | 10/2007 | |

* cited by examiner

PRIOR ART

Fig. 8a
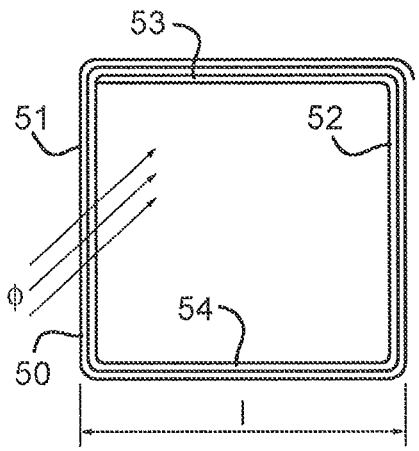
Fig. 8b
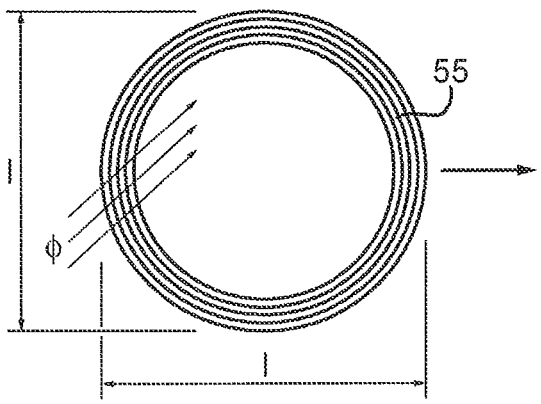
Fig. 8c
$$emf = \frac{d\phi}{dt} \cdot l \qquad emf = \frac{d\phi}{dt} \, rms \, \frac{\pi}{2} \cdot l$$
$$= \frac{d\phi}{dt} \underline{\underline{1.11\,l}}$$
Coil resistance: $\underline{\underline{4l}}$    Coil resistance: $\underline{\underline{\pi l}}$
Fig. 8d
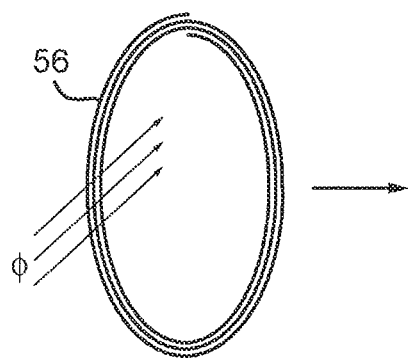

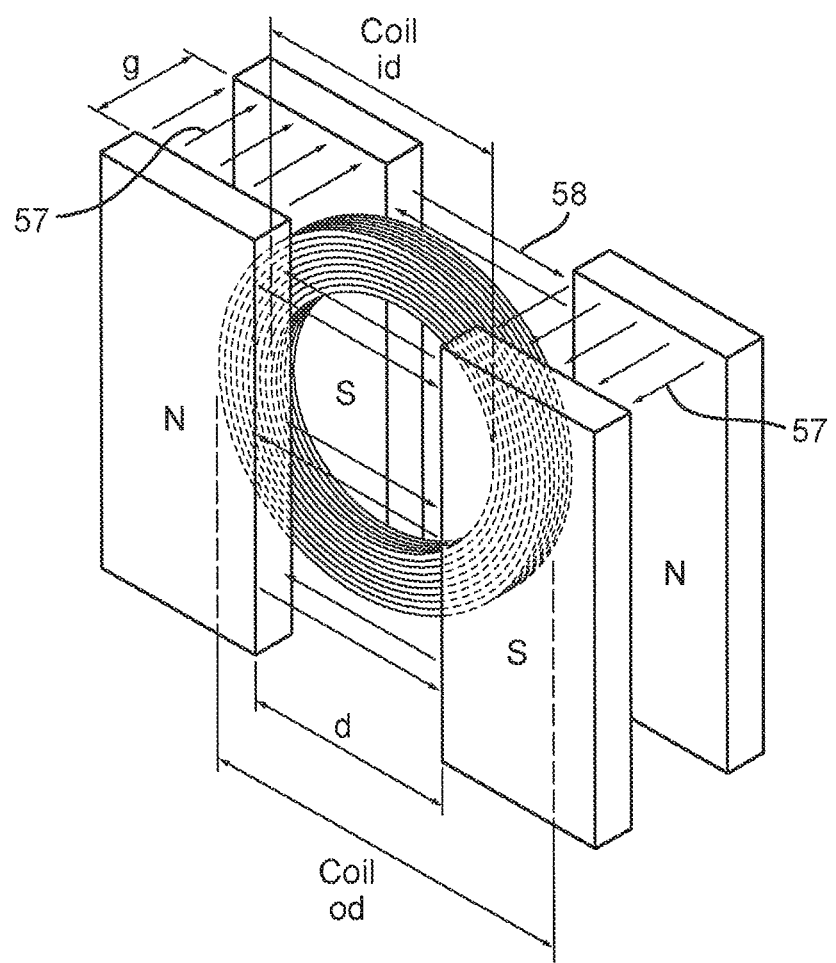

Fig. 17
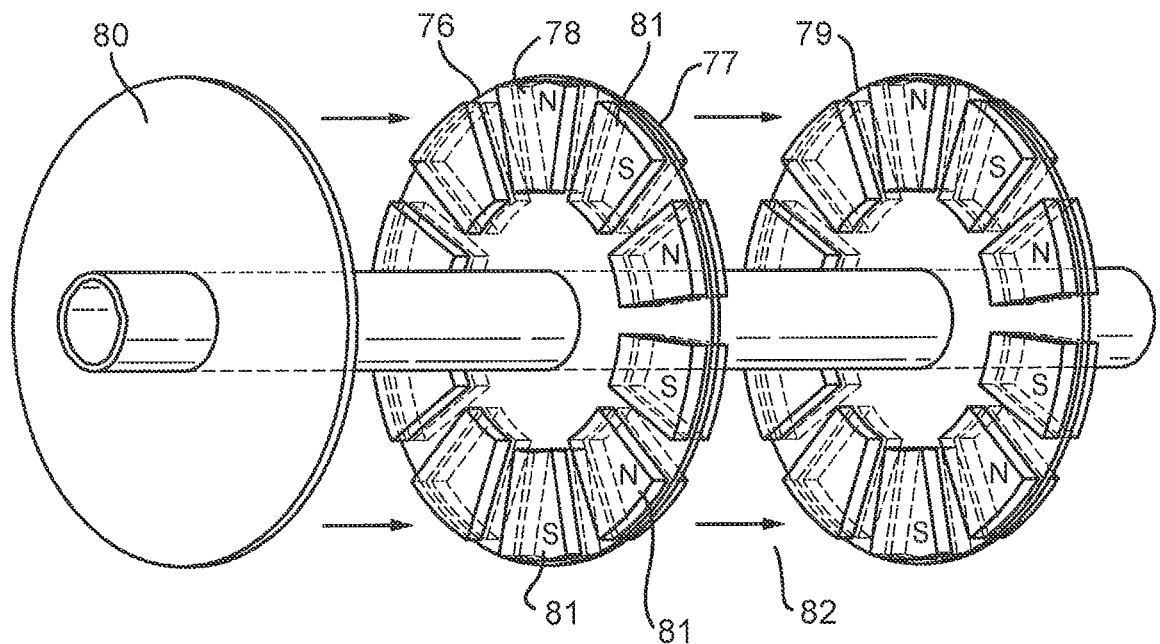
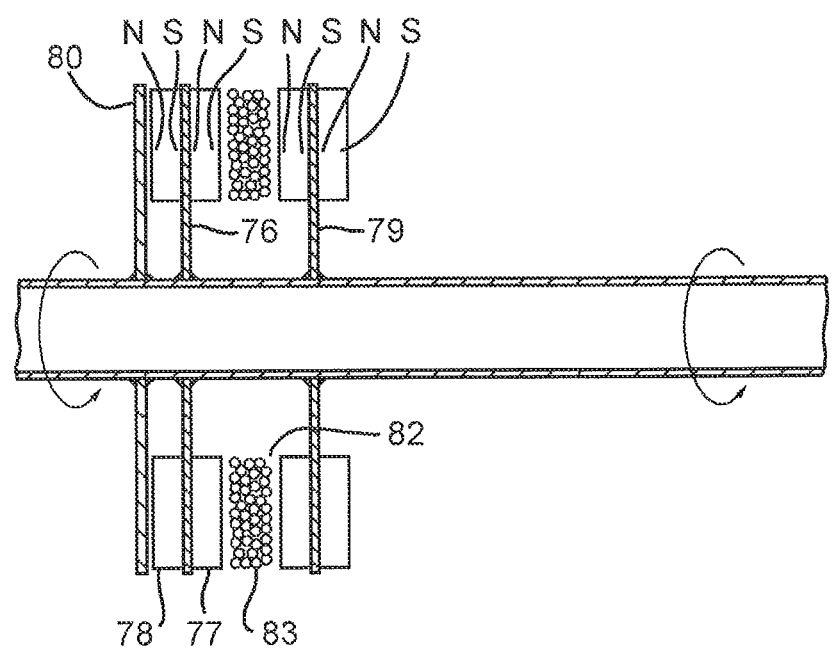

DIRECT DRIVE GENERATOR FOR RENEWABLE ENERGY APPLICATIONS

The following invention relates to electrical generators, and in particular generators used within wind turbines or in tidal flow energy conversion systems.

With the advent of global warming, the exploitation of every viable form of renewable energy is becoming increasingly important. The harnessing and conversion to electricity of wind or tidal flow energy is being recognised as an important contribution.

In general, devices for converting wind energy or tidal flow energy to electricity use gearboxes to step up the relatively slow speed of rotation of a rotor to the necessary speed required to drive a generator. Gearboxes are however prone to failure and present expensive and difficult maintenance challenges, especially for off-shore wind turbines.

Preferably, in order to avoid the need for gearboxes, a direct drive generator may be employed. Several designs are currently under development and test.

In direct drive generators, the rotor of the energy harnessing device is coupled mechanically directly to the generator's armature. This therefore avoids the need for gearboxes.

An example of such a direct drive design is one in which the generator comprises a large circular planar stator and armature, each often having a diameter of several meters. The stator carries permanent magnets, and the armature the generator coils. The rotor of the energy gathering device is used to drive directly the generator's armature relative to its stator. In one existing design, the permanent magnets are embedded upon either side of their own large single piece U shaped annulus. The coils are mounted in effect upon a separate annulus, sandwiched between the magnets, and which is mechanically linked to the rotor such that rotation of the rotor causes the coil carrying annulus to rotate and thus cut the lines of flux provided by the magnets. An electro-magnetic force (emf) is thereby generated. Because the electro-magnetic force (emf) induced in the coils is dependent upon the rate at which the magnetic lines of force cut them, the very large diameter is needed to compensate for the typical slow rotary speed of the energy gathering device (for wind turbines, typically 20 rpm.)

Typically, the permanent magnets used in such a design are of a large flat construction, having a substantial surface area, and are magnetised axially. They are of the rare earth type, typically neodymium boron iron, which provides very high field strengths so resulting in the generation of as much electrical power as possible within a given room envelope. The armature coils are of a similarly large rectangular construction to take advantage of the flux provided by the magnets. A disadvantage of this arrangement as applied, e.g., to wind turbines, is that the large surface area typically presented by the planar containers housing these components is disruptive to the laminar flow of wind over and through the wind turbine. In addition, the use of rare earth magnets is expensive, and world supplies are limited. A preferred design is one which largely overcomes these disadvantages.

According to the invention, a direct drive rotary generator is formed of an elongate cylindrical series of stator annuli and a coaxial elongate cylindrical series of armature annuli and mounted for relative rotational movement around their common axis, the series of stator annuli interleaving the series of armature annuli, and either of the armature/stator annuli having a contiguous or substantially contiguous sequence of coils around its circumference, and the other of the armature/stator annuli having a corresponding sequence of permanent magnets of alternating polarity spaced around its circumference and at the same pitch as that of the coils, the arrangement being such that lines of magnetic flux passing across the air gap between one magnet carrying annulus to the next cut the turns of the coils of the corresponding interleaved coil carrying annulus, and thus induce in the coils electromagnetic forces as the armature is caused to rotate relative to the stator.

The generator terms stator and armature are used for convenience, but do not necessarily denote which of the two is turning relative to any external frame of reference.

In a preferred embodiment, the stator and armature annuli are each self contained. By this is meant that each annulus—whether part of the stator or the armature—does not require for its effective operation any dedicated form of physical magnetic coupling, or contact, from the one to the next, as would be the case when using, for example, a conventional U shaped stator or armature in which permanent magnets of opposite facing polarity are mounted on the inner facing arms of the U, and the U serves, in one manner or another (such as being constructed from soft iron) to effect/enhance closure of the magnetic circuit.

In a further preferred embodiment, in order to provide a convenient method of mounting, the stator and armature annuli are affixed respectively onto the exterior and interior surfaces of coaxial thin walled cylinders mounted on a bearing system such as to enable rotation relative to one another. In practice, the inner series of annuli are mounted onto the outside surface of the inner cylinder, and the outside series of annuli are mounted within the inside surface of the outside cylinder. The two cylinders thus provide a convenient and inexpensive means of maintaining all of the interleaving annuli in line with one another.

The cylinders may be pre-grooved around their respective external and internal surfaces in order to receive and align the annuli accurately.

According to an aspect of the invention, the axis of the coils of the generator lies parallel to that of the common axis of the cylinders.

According to a further aspect of the invention, the axis of the magnets of the generator also lies parallel to that of the common axis of the cylinders.

It will be recalled from the foregoing that current designs are of large, indeed substantial diameters, presenting a number of practical difficulties in terms of construction, installation and operation.

In the case of the generator disclosed herein, in which elongate series of interleaving armature and stator annuli are used for the generation of electricity, it will be appreciated that the two series may simply comprise as many annuli as are necessary for the complete conversion of the mechanical power available to electricity.

Thus, rather than depending on a large diameter form of stator and armature, this may instead by achieved by the use, in effect, of a longer generator but of a lesser and more practical diameter.

In addition, on account of the fact that this form of construction allows for the aforesaid numerous annuli, a large number of permanent magnets and coils may be employed, making feasible the use of low grade permanent magnet material rather than high strength rare earth magnets again used by current designs. The cost of the extra copper, approximately two to three times as much being needed in such an arrangement as compared to a generator equipped with rare earth magnets (and providing the same power), is dwarfed by the savings in cost of the magnets, rare earth magnets presently costing at least thirty times that of low grade magnets.

In a preferred form, the low grade magnets are made from the permanent magnet material known as ferrite, and its compounds.

Ferrite has important advantages over rare earth, as well as being inexpensive, it does not corrode, nor demagnetise at relatively low temperatures.

Many conventional designs of electrical motors or generators, use coils which are substantially rectangular.

The winding of rectangular coils, as may typically be used in known art direct drive rotary generators of this type, is onerous and slow. Copper wire is simply reluctant to be formed around tight corners, and the resulting packing factor is not ideal. It is a relatively expensive process. In addition, in applying the principles of Fleming's right hand rule in terms of electrical generation, it is evident that only the sides of any such coil are operative to generate an emf as it is only they that are cut by the lines of magnetic flux passing across and through them. The upper and lower portions of the coil, travelling parallel to the direction of motion, contribute nothing and only serve to add parasitic heating $I^2R$ losses across their respective lengths.

Using however coils of circular construction, which are easy and inexpensive to wind, it can be seen that theoretically only the infinitesimally small upper and lower portions contribute nothing to the induced emf. In these circumstances, it can be shown mathematically that for a round coil having the same side to side width as an equivalent square coil of the same number of turns, a circular coil generates up to 11% more emf and a resistance reduction of up to 20%.

Thus, in a specific embodiment of the invention, circular or substantially circular coils are used within the coil carrying annuli of the generator. Additionally, in order to maximise active generation, these abut, or substantially abut, one another around the circumferential length of the annulus in which they are embedded, such that in effect the side of one coil touches, or is close to—in terms of the gap between them as compared to their individual diameter—the side of each of its neighbours. As aforesaid, the pitch of the permanent magnets embedded on the other (armature) set of annuli, is arranged to be the same as that of the coils. But they are placed such that their polarity, as they face the coils, alternates from one to the next. Thus, when the south pole of one magnet passes, in use, across the abutting sides of two coils, the north poles of the magnets on either side of the first magnet pass across the other sides of the two coils. On account of the fact that the direction of each coil turn is naturally reversed from one side of a coil to the other, this arrangement ensures that the emfs generated in each side of each coil are additive. Furthermore, all of the coils are connected in series or in parallel, or a combination as desired, further to add their respective emf outputs.

In a further aspect of this embodiment, each of the annuli housing the permanent magnets are rotationally displaced relative to their neighbours by one magnet pitch, such that the north face of one magnet is opposite the south face of the corresponding magnet in the next annulus, and so on, the arrangement being such that lines of magnetic flux pass favourably (and necessarily) from one to the other in a direction substantially parallel to the axis of the cylinders, and orthogonally across the turns of the coils embedded in the coil carrying annulus sandwiched by them. Where there are many magnet annuli, the field strength becomes naturally self-reinforced in consequence. This has several important advantages. Firstly, it serves to maximise the flux cutting the coils and therefore the emfs induced in them. Secondly, because the flux is passing advantageously directly across the air gap, the air gap need not be small. This is of significant consequence in terms of ease of assembly, and accommodating bearing tolerances.

It will be recalled from the foregoing that the stator permanent magnets alternate in polarity around the annulus on which they are mounted and that opposite poles of the stator magnets face one another. While this arrangement serves to ensure that the electromagnetic forces generated on either side of any given coil are additive, one disadvantage of this arrangement may arise in terms of lateral flux leakage. This can occur between one side of a magnet to the side of its neighbour, as the side of each magnet is effectively in attraction to the next.

An example of this are the permanent magnet rotors of axial flux generators of the prior art, which typically disclose magnets disposed around the circumference of the rotor but with their sides nearly adjacent to one another. Examples are the rotors shown in USA patent no. US2008/0231132.

As in the present invention, their outwardly facing faces are arranged in an alternating polarity configuration, i.e. NSNSN. Thus it will be appreciated that the side portions of adjacent magnets are in attraction to one another. For example, a top outwardly facing north face will have a north polarity along its two outer longitudinal edges, and a south polarity along the two edges of its inwardly facing face. These edges will be in direct attraction to the adjacent south pole edges of the outwardly facing south pole magnets and their north poles edges of their inwardly facing edge.

As aforementioned, this results in noticeable lateral flux leakage from the side of one magnet to the next, detracting from the flux density crossing the gap between magnets of facing rotors. Although disadvantageous, it is not too detrimental to performance, where, as in the two cited patents, rare earth magnets are utilised (for example those known as neodymium boron iron). This is because the fields available are so relatively intense that ample flux still remains available within the gap separating the rotors still to generate adequate emfs in the coils sandwiched by them.

However, in the case of a ferrite magnet based system as is the case of the present invention where the available field intensity B is far less than that of rare earth based systems, any loss of field is of real consequence to the generation of electromagnetic forces.

One solution is simply to increase the gap between successive magnets. However, this is detrimental to the emf generated, as a smaller number of magnets will be present, so reducing the number of lines of force crossing between rotors and resulting also in a reduction of the number of coil turns per unit length around the circumference transcribed by the coils.

Therefore, in accordance with a feature of the invention, a compromise is reached in which the ratio of the lateral distance separating the magnets and the number of turns of the coils passing by them is optimised to obtain the highest generated output.

In a further improvement, again to reduce flux leakage, the permanent magnets may be bisected such that each is comprised of two planar halves, each half being oppositely affixed to either side of a central ferromagnetic annular disc. This disc, with its magnets, in effect comprises the armature annulus, and thus provides a ready path for flux to pass from the inner side of each magnet both through the disc to its opposite half as well as laterally to the inner sides of the ones on either side of it, but only predominantly at the point where their halves magnetically and physically conjoin onto the disc. This arrangement, mirrored by an identical arrangement on the other side of the sandwiched coil, thereby provides for both an improved magnetic flux density as well as an improved magnetic circuit for the magnetic flux, reducing the leaking laterally between the sides of the adjacent magnets.

For any such rotary generator, a multi-phased output is preferred, for example three phased, to suit for example the subsequent processing of the generated electricity by control invertors or the like.

According to an aspect of the invention, this may be achieved by dividing adjacent coils around each annulus into a number of groups, each group being rotationally displaced relative to its neighbours by the required phase angle. Thus, to achieve a three phase output, the coils would be divided into three groups, each 120° displaced in phase relative to its neighbour. In another form, whole annuli or groups of annuli may be rotationally displaced relative to one another also to achieve the desired phase angle. In this latter case, each group requires its dedicated magnetic annulus, or annuli, to avoid conflict with the neighbouring group.

The invention will now be described with reference to the accompanying drawings in which.

Figure 2:
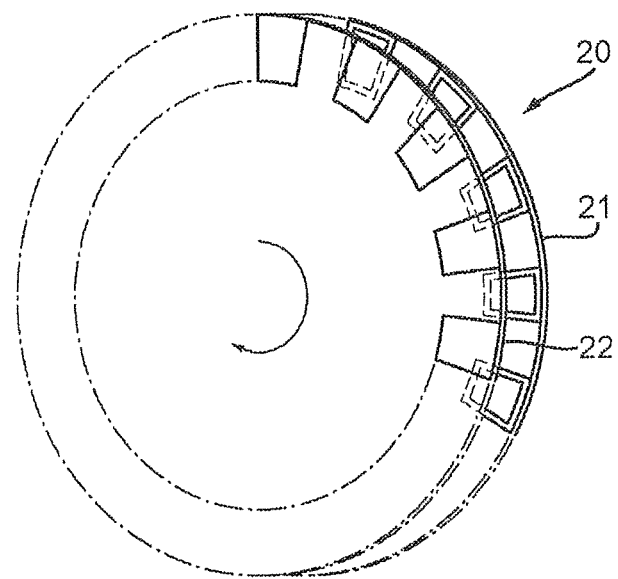
FIG. 2 is a general view of a typical prior art generator
Figure 3A:
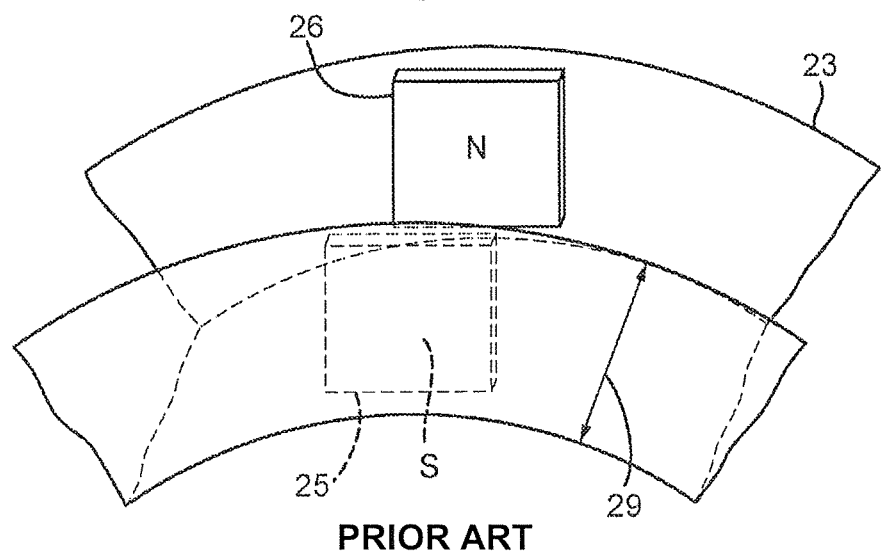

FIGS. 3a b & c show the typical construction of the stator and armature components of the prior art generator of FIG. 2

Figure 4:
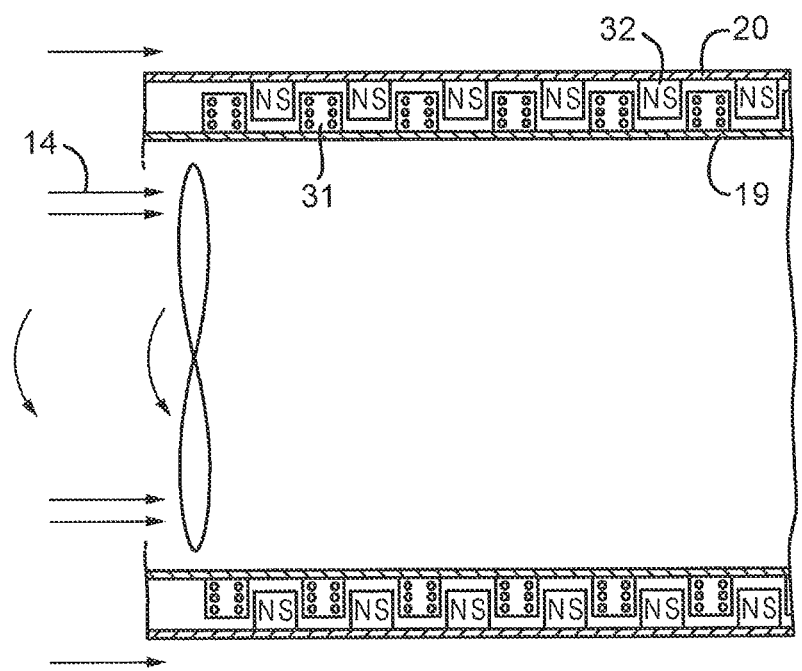

FIG. 4 shows a detailed sectional view of the generator of the invention

Figure 1:
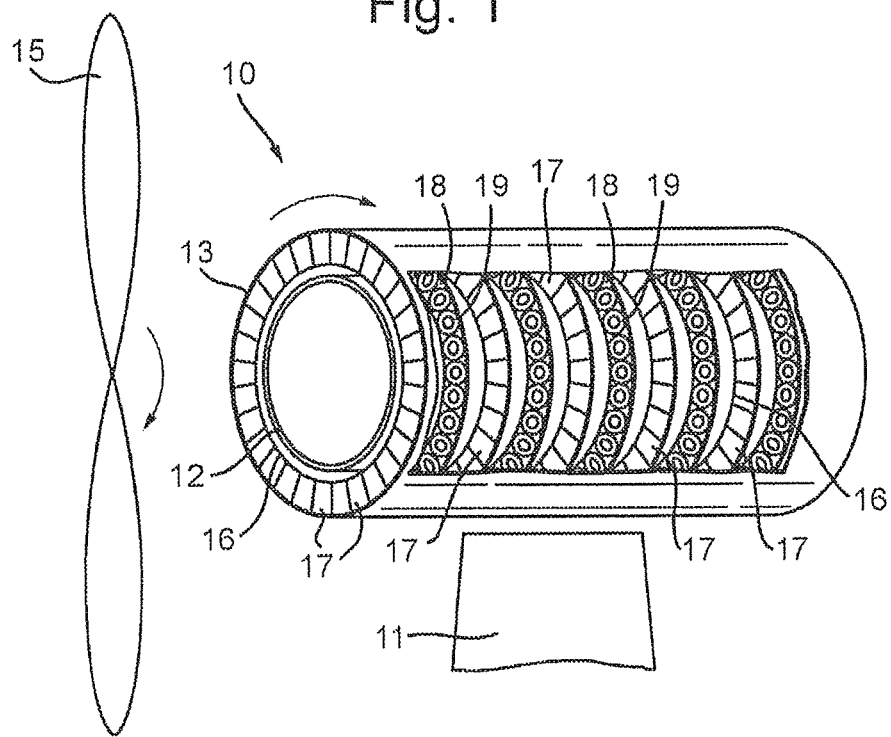
FIG. 1 is a general view of the generator of the invention
Figure 5A:
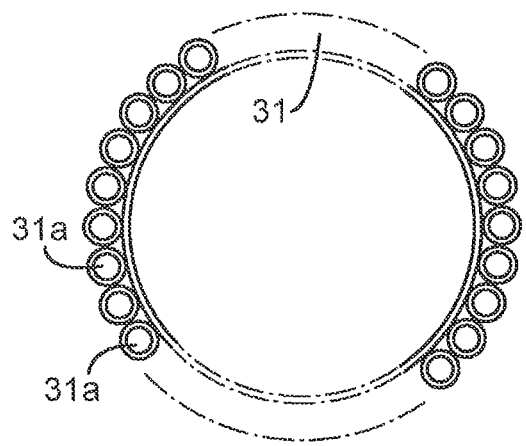
Figure 6A:
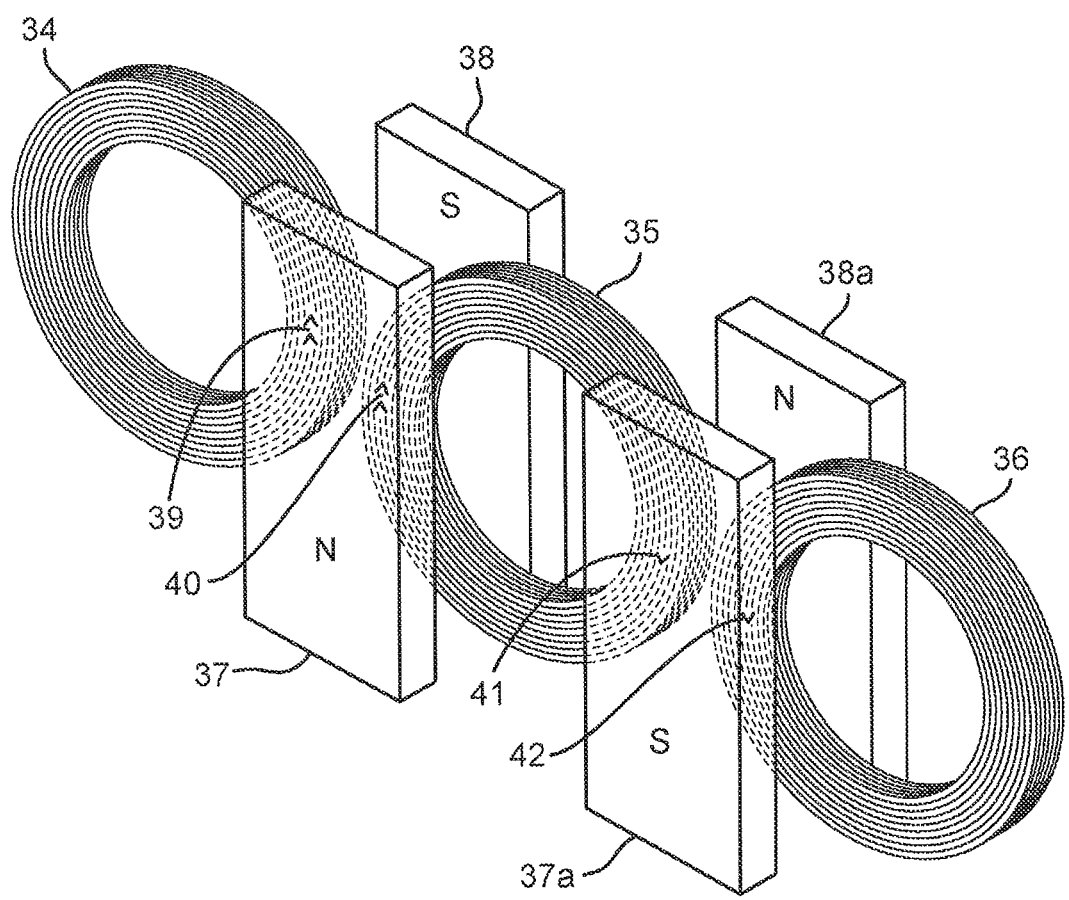
Figure 7A:
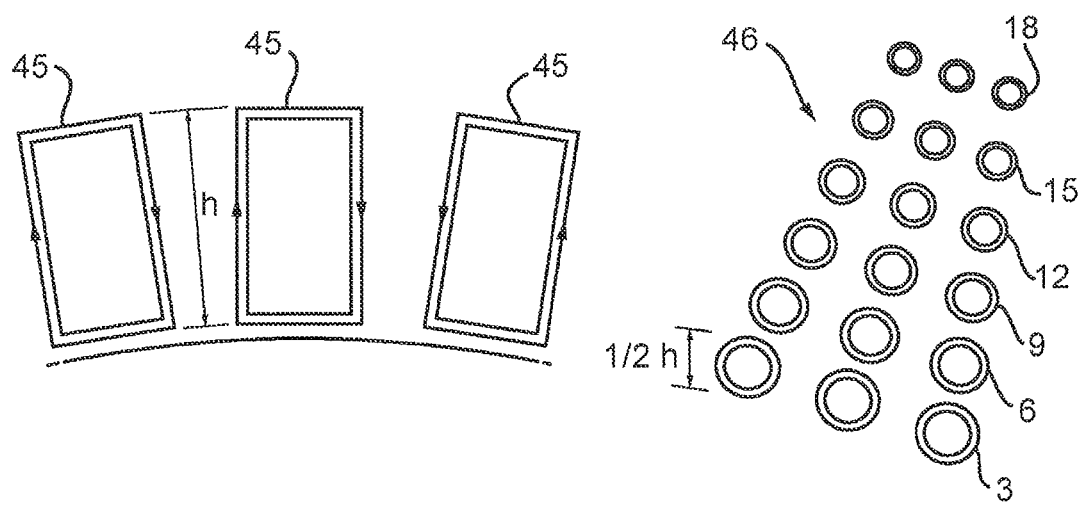

FIGS. 5a and b show the construction of the stators and armatures of the generator FIG. 6a b and c show in detail the juxtaposition of the coils and permanent magnets of the generator FIGS. 7a and b shows a comparison of the coils used within the generators of FIGS. 1 and 2, and the effect on the generator's dimensions FIGS. 8a and b show two different coils types usable within the generator and FIG. 8c shows equations comparing their respective performances and FIG. 8d shows a variant to the coil of FIG. 8b FIG. 9 shows a view of the flux paths between facing magnets.

Figure 10:
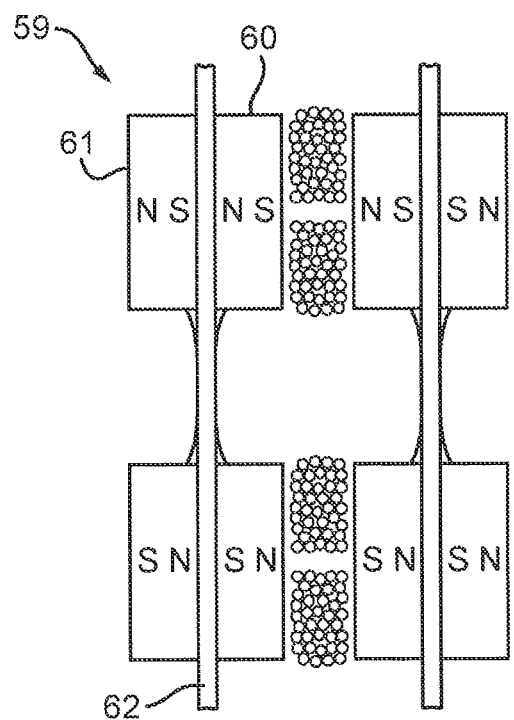

FIG. 10 shows also flux paths and the use of a ferromagnetic disc for mounting the magnets.

Figure 11:
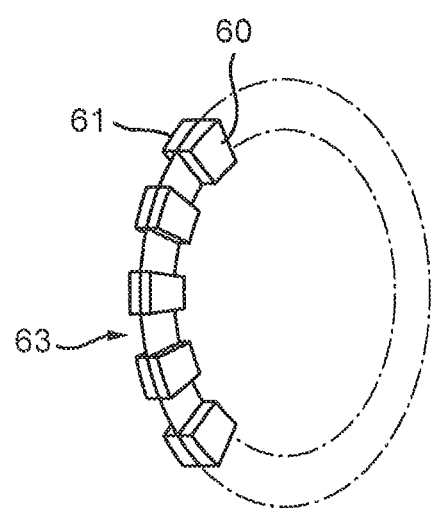

FIG. 11 shows a perspective view of the arrangement of FIG. 10

Figure 12:
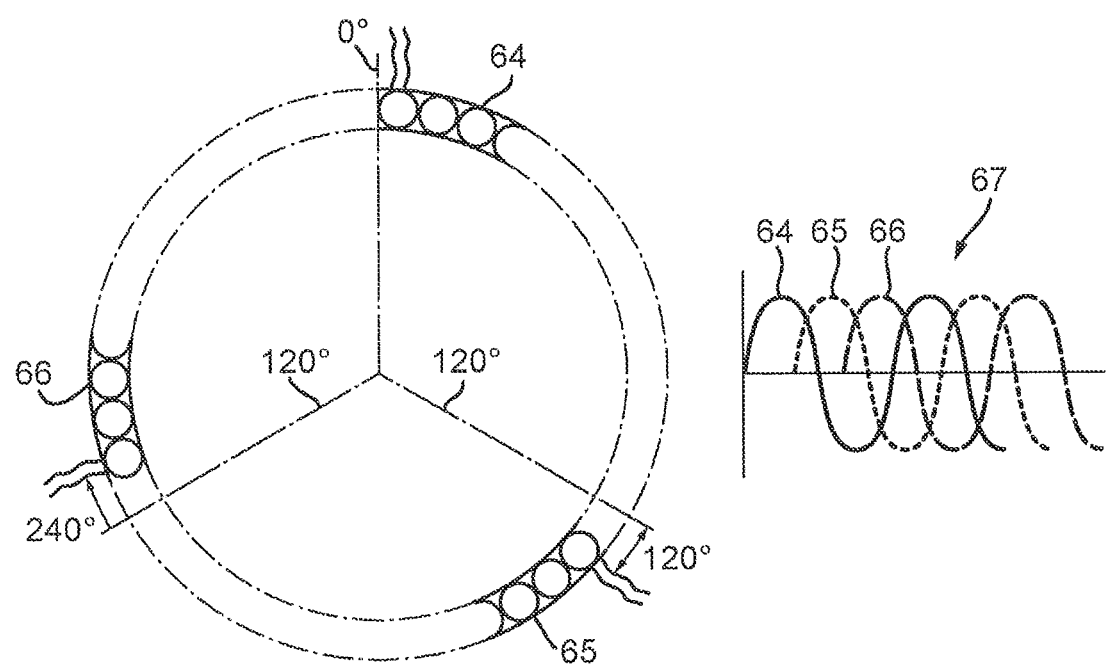

FIG. 12 shows a stator annulus divided groups of coils

Figure 13:
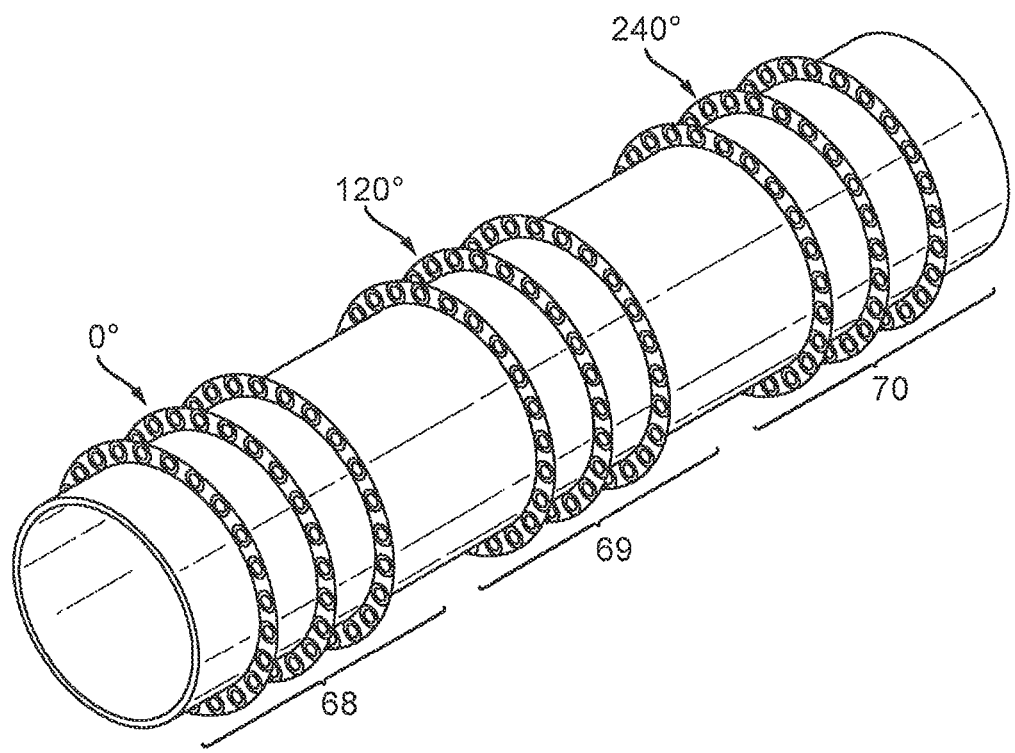

FIG. 13 shows the grouping of stator annuli to obtain a multi-phase output

Figure 14:
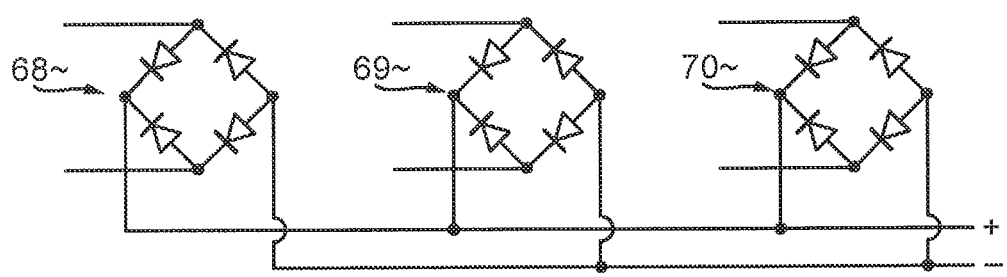

FIG. 14 illustrated the rectification of multi phase outputs to obtain a direct current output.

Figure 15:
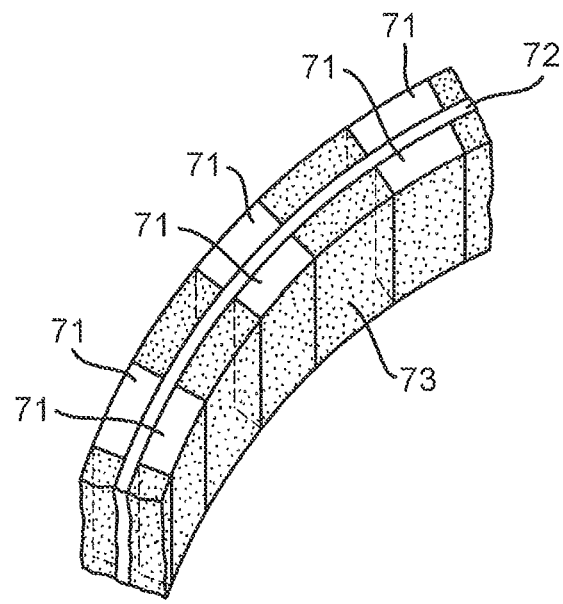

FIG. 15 shows encapsulated magnets

Figure 16:
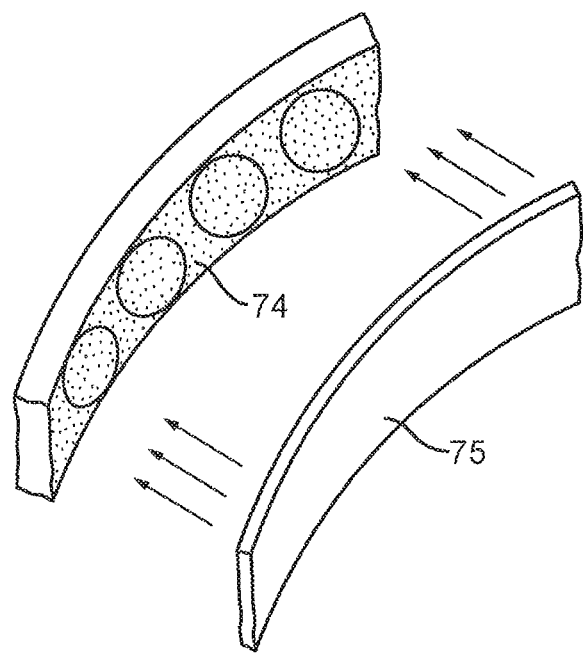

FIG. 16 shows encapsulated coils

FIG. 17 shows an alternative arrangement of end rotors for placing at each end of a series of rotors.

Referring to FIG. 1, the generator of the invention is generally depicted at 10, and is shown supported by a wind turbine tower 11. The generator comprises two coaxial cylinders 12 and 13 sharing a common longitudinal axis. The inner cylinder remains stationary, whereas the outer cylinder is free to rotate on a central shaft (not shown). The outer cylinder 13 is directly driven as indicated by the arrow by a wind turbine rotor, shown schematically at 15. The outer cylinder supports along its interior surface a number of annuli 16 carrying permanent magnets 17. The internal fixed cylinder supports along its length a number of stator annuli 18, interleaving those of the armature, and which carry the coils 19 of the generator. As the outer cylinder is caused to turn by the rotor, the lines of flux created by the permanent magnets cut the turns of the coils, and electricity is generated.

Referring to FIG. 2, a direct drive generator of the prior art is now shown generally at 20. It can comprise two large circular discs, 21 and 22. One disc, for example 21, remains stationary, while the other disc 22 is caused to turn relative to it. The two discs support respectively permanent magnets and generating coils. Relative motion between the two results in electrical generation.

In order to facilitate a fuller understanding of the present invention, and its advantages, an explanation is first given of the method of operation of the prior art type of generator depicted in FIG. 2.

Figure 3B:
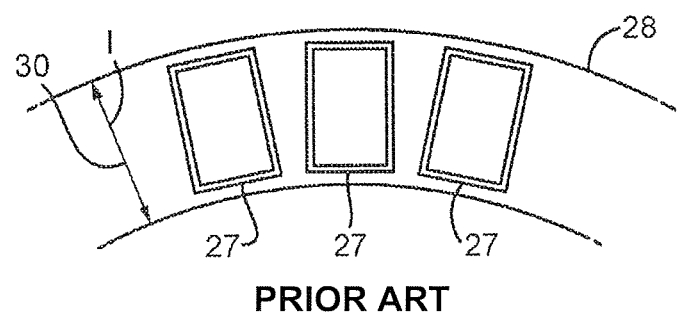

Referring to FIGS. 3a, b & c, the operative components of such a prior art generator comprise, in the case of its stator, an annular channel fabricated from a U channel, as shown in FIG. 3a at 23, usually constructed from soft iron, and around and upon the inside faces of the vertical arms of which are affixed a number of permanent magnets, eg 25 and 26, with opposite poles facing as shown. In the case of the armature, this is formed of a number of rectangular coils, 27, mounted upon an annular frame 28, as shown at FIG. 3b. This is mounted for rotation, and is directly mechanically coupled to the rotor of the device, such that as the rotor turns, the coils are caused to pass around and though the gap between the magnets. As the coils cut the lines of force extending between the magnets, an electromagnetic force (emf) is generated. The construction of the U channel out of soft iron, and having a base 24 linking the two sides of the channel, serves to enhance and close the magnetic circuit created by the permanent magnets. The foregoing, or variations to it, are the basis of many direct-drive rotary turbine generators, as are currently being tested or being considered for tidal generation and/or wind power conversion.

A disadvantage of such a design is that conversion of all of the mechanical energy available to electrical energy must take place within the confines of the physical room envelope occupied by the annuli. In consequence, the radial height 29 of the annulus 23, and the magnets borne thereby, as well as the coils 27, must be made such that sufficient length of conductor "l" as shown at 30 is present to cut the available lines of magnetic force to generate the required emf for this purpose. In addition, in order to achieve a sufficiently high peripheral speed, and therefore effective generation, the overall diameter of the stator and armature must be significant, typically several meters. This is clearly a disadvantage, especially considering mechanical stability, maintenance of fine air gaps and wind resistance.

A second disadvantage of this type of generator concerns the type of magnet used. Again, in order to be able to capture the mechanical energy presented and convert this to electricity within the available room envelope, as shown at FIG. 3a, rare earth permanent magnets having high field strengths, must be utilised. Although rare earth magnets, such as those known as neodymium boron iron are effective to provide high field strengths, their cost has become prohibitive. There is also a very finite resource of this material available world wide, and certainly insufficient to sustain the growing world wide use of them in tidal flow and sea wave energy conversion devices as well as electrically powered vehicles.

Referring to FIGS. 4, 5 and 6, a description is now given of the generator of the invention, and how the aforesaid difficulties are circumvented.

As has been explained with reference to FIG. 1, the generator of the invention comprises two elongate cylinders, coaxial with one another and sharing a common axis. In this particular configuration, the inner cylinder 19 is maintained stationary, and the outer cylinder 20 rotates.

In order to generate electricity, each cylinder is equipped with a number of spaced annuli 31 and 32 along its length, each overlapping the next, as shown at FIG. 4. It can be seen that in the case of the outer cylinder, the annuli are mounted around the inside of and at regular intervals along its inside surface, and in the case of the inner cylinder, the same applies except around and along its outside surface. The outer cylinder is mechanically directly coupled to and driven by the source of rotary mechanical energy, for example the blades of a wind turbine.

Figure 5B:
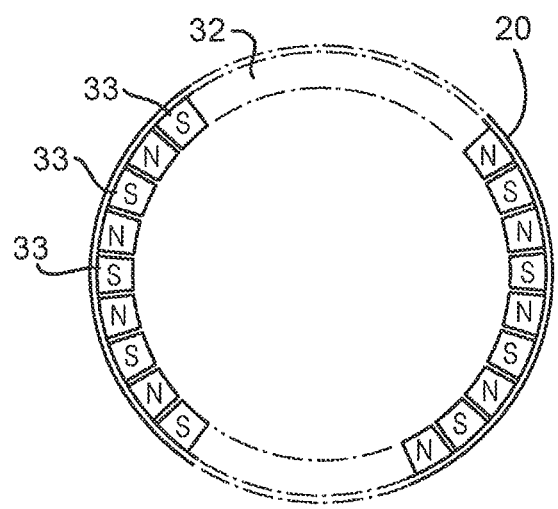

The inner annuli 31 are populated around their circumference with a contiguous sequence of circular coils, each abutting, or nearly so, its neighbour, as shown at 31a in FIG. 5a. The outer annuli 32 are similarly populated around their circumference, as shown at FIG. 5b, but with a sequence of axially magnetised permanent magnets, 33, alternating in polarity as shown, and spaced circumferentially at the same pitch as the coils.

The effective arrangement is shown in perspective at FIG. 6. Three coils around one stator annulus are shown at 34, 35 and 36 and two sets of armature annuli permanent magnets are shown respectively at 37, 37a and 38, 38a. The annuli magnets 37 and 38 and 37 a and 38 b, are arranged such that opposite poles face one another as shown, as well as alternating in polarity laterally from one to the next.

Figure 6B:
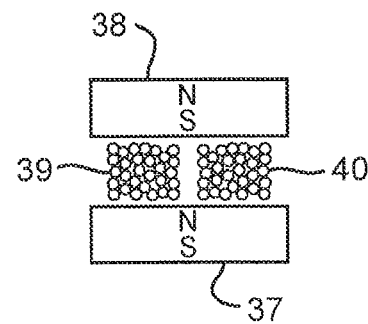
Figure 6C:
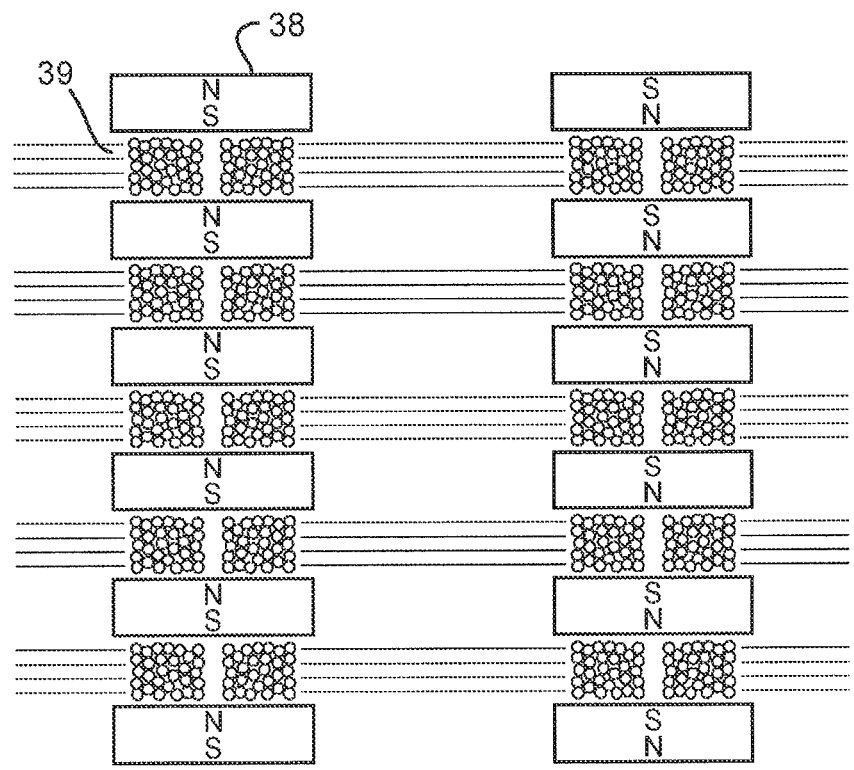

The method of operation and generation of electricity is as follows. As each side portion 39 and 40 of two adjacent coils is cut by the permanent magnet fields passing though them (see also inset at FIG. 6b), so emfs are induced in the two side portions. (A plan view is shown at FIG. 6b). For the sake of reference, the emfs are generated anticlockwise and clockwise in each coil, as shown. Consideration of the coil side portions 41 and 42, which are now sandwiched between opposite polarities to before, show that the emfs are now generated respectively also clockwise and anticlockwise, thus being in the correct sense to add to the previous set of emfs and so on. Thus, around the entire circumference, emfs are additively generated as the magnetic fields cut the coil side portions.

As each travelling facing magnet pair reaches the centre portion of its corresponding coil, the emf generated reduces to zero. As the magnet moves on from the central position, the emf then re-builds, but in the opposite direction, as the polarity of the magnets is now in the opposite sense with respect to the coil sides. Thus continuous alternating current is generated, both the frequency and amplitude of this being dependent—as is customarily the case—upon the rate of rotation. Owing to the disposition and placing of the coils and the magnets, the whole circumference of the annulus is advantageously filled with coils for generation, providing in effect a chording factor of unity.

This magnet/coil pattern is continued between the annuli along the full length of the cylinders. This is shown schematically at FIG. 6c.

Figure 3C:
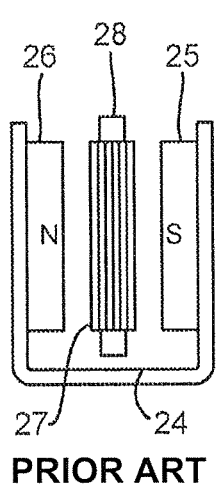

It will be appreciated that a very considerable number of coils 39 and permanent magnets 38 can thus be readily accommodated, far greater in number than the arrangements of FIGS. 2 to 3. It will also be appreciated that, on account of the fact that all of the magnetic fields pass through their sandwiched coils directly from one magnet face to the next, and so on along the full length of the stack of armature annuli, there is no need for any soft iron coupling to complete specific magnetic circuits from one annulus to the next.

On account of this greater number, which can comfortably be three, six or even twelve fold that of the single annulus type of construction, ordinary low grade magnets may be used, such as those known as ferrite. The relatively low field strength of ferrite magnets (approximately one third that of rare earth) is compensated for by having more in number, for example thrice.

This represents a very significant price saving, as, at the time of applying for this patent, rare earth magnets cost per unit volume typically thirty times that of ferrite magnets. In addition, ferrite magnet material is available in abundance word-wide, as opposed to rare earth material the supply of which is virtually exclusively controlled by certain territories. It will be readily seen that on account of the extended number of coils, more copper is required in this design, but again, this extra cost is insignificant compared to the savings in price of permanent magnets.

Figure 7B:
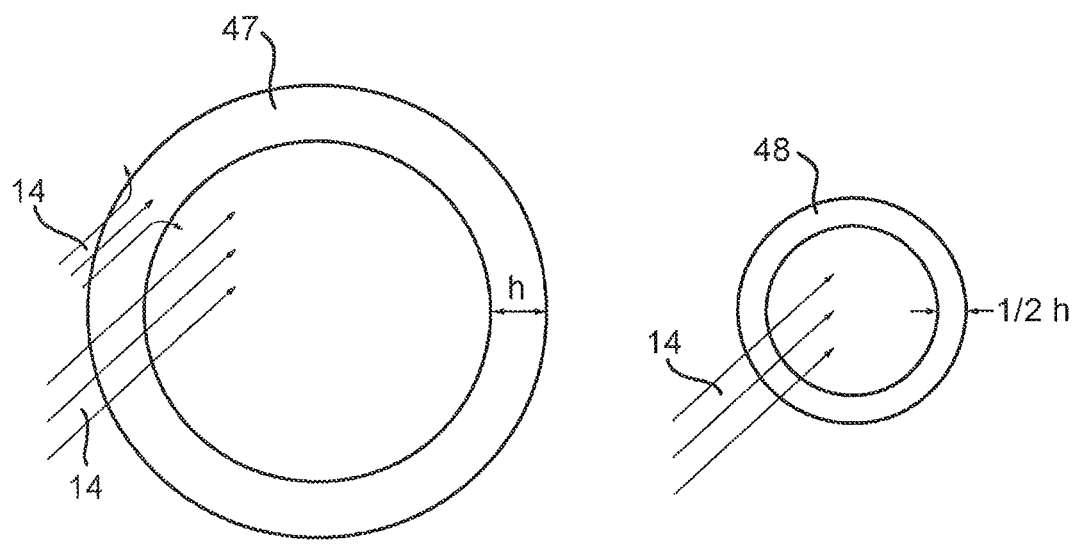

A further advantage arises concerning a reduction in the radial width of the annuli. On account of the fact that so many can be accommodated along the elongate length of the cylinders, this makes possible a reduction in their required radial width. This is illustrated with reference to FIGS. 7 a and b. The coils shown at 45 represent the type used in the generator of FIG. 2 and their height is shown symbolically as "h". The equivalent coil bank shown at 46 comprises eighteen coils, namely six times as many, but at a height of h/2. The first tripling of the number of coils from 3 to 9 broadly accounts for the reduction in field strength when using ferrite magnets, and the further doubling enables a halving of their radius, and thus the corresponding radial width of the annulus in which they are mounted.

Thus, in broad terms, were the conventional design annulus to be 20 units across, this could reduce in the case of the present invention, to 10 units and thus reduce substantially the facial area presented by the generator to e.g. air flow passing across a turbine. This is shown schematically at FIG. 7b at 47 and 48, where the turbine at 47 represents the previous prior art design, and that at 48 the generator of this invention.

A key consideration in the design of any permanent magnet electrical machine is the effectiveness with which the lines of force available from its magnets are used and/or guided to generate electromagnetic forces in the coils.

In the design of the present invention, on account of the construction of the armature, lines of force cross favourably directly across the air gap occupied by the stator annuli coils from one magnet face to the one opposite it. This is an ideal situation. There is no need for iron in the circuit, and the local field strength is determined solely by the type of magnetic material selected and the proximity of the two faces. Optimising the design in this format is relatively straightforward. However, in the case of the coils, this is not so apparent. Were the coils of the stator to be of a rectangular or square cross section, as shown at 50 in FIG. 8a, then it can be seen that only the vertical sides 51 and 52 of the coil cut the lines of flux crossing form one magnet to the next, and that it is therefore only they that will experience any induced emf. The top and bottom portions 53 and 54 contribute nothing. Their role is only to provide a connection path between the two sides of the coil, and in doing so they suffer parasitic $I^2R$ heating losses.

However, were the coil to be of a more circular cross section, or even perfectly round, as shown at 55 in FIG. 8b, then in applying the same consideration, it can be seen that only the infinitesimally small portions of the coil at its top and bottom fail to contribute towards the induced emf.

It can be shown mathematically, as illustrated at FIG. 8c, that in comparing the two types of coil, square as opposed to circular, the latter generates within a uniform field over 11% more emf for a given total conductor length. The total conductor length in this case, and therefore its ohmic resistance, is also beneficially reduced, as outlined also at FIG. 8c. This phenomenon may advantageously be used in this form of generator, particularly where it is desired to keep the radial widths of the stator and armature annuli as low as possible. It should be noted that the coils need not be truly round. An elliptical form, as shown at 56 in FIG. 8d, presents an even more favourable effective length of conductor perpendicular to the lines of flux crossing it. The exact choice of coil design in practice takes into account the local pattern of magnetic flux between facing magnets, and can be obtained both empirically and theoretically. In any case, an additional significant advantage arising from the use of circular coils is that they are notably easier (and therefore less expensive) to wind in comparison to rectangular coils.

Despite the favourable disposition of lines of flux between facing magnet poles, as aforesaid, one potential limitation of this design concerns the lateral leakage of flux between adjacent magnets. This is shown in FIG. 9 in which lines of force 57 are depicted crossing between pole faces, but lateral leakage occurs also, as shown at 58 between the sides of the magnets. To mitigate this effect, the lateral spacing, "d" is determined, relative to the spacing "g" across the air gap, to minimise this effect. Such determination of the distances d and g, is also made in consort with the design of the coils. This is achieved by finding the optimised ratio between the inner and outer diameters of the coils, id and od, and the spacings d and g. By this means performance is optimised in terms of the emf induced in the turns of the coil for any particular given magnetic configuration.

To mitigate this effect further, an alternative arrangement is shown at 59 in FIG. 10. In this, the permanent magnets are split, in a planar sense, across their widths into two halves 60 and 61. (In practice, this is achieved by the use of two half width magnets.) Each half is then affixed on to either side of an annular ferromagnetic disc, 62. The disc serves to provide a favourable path for flux to pass from the mating inside faces of adjacent magnets to one another, as well as directly across the plate between inside faces. The effect of this is to reduce the degree of lateral flux leakage, and to enhance commensurately the field strength in the air gap. A three dimensional depiction of an annulus with the magnets mounted thereon in this manner is shown at 63 in FIG. 11.

In addition, the magnets may be shaped, i.e. rather than being of a straight edged rectangular form, their sides may be wasted, or otherwise contoured, to optimise the flux cutting the coils while maximising the flux cutting the coils.

It is common practice for generators to be wound such as to provide a multiphase output, for example three phase, for transmission purposes or for further processing by electronics equipment. In the case of the generator of the present invention, this may be achieved by splitting the coils around the stator annuli into three groups. This is shown at FIG. 12, where there are three groups, 64, 65 and 66 and each is rotationally phase displaced from its neighbour by 120°. This results in a three phase electrical output as shown as 67. This arrangement, as well as providing a three-phase output, has one further advantage inasmuch that electro-mechanical cogging forces are substantially reduced.

Cogging forces arise due to the cyclically varying forces within permanent magnet electromagnetic machines as generation takes place. At certain points during a revolution for example, maximum counter-torque forces arise as maximum emfs are generated—in the case of the generator of this invention, being the points where the lines of flux crossing between facing armature permanent magnets pass through the sides of the windings of adjacent coils. At this moment, the resistance force rises to a maximum. As the lines of flux progress to pass across the central portions of each coil, no emf is generated, and the force falls to zero. There is therefore a considerable cyclic variation in counter-torque as the armature revolves around its stator.

By separating the coils into three groups, which are phase displaced such that the cogging forces in each group do not take place together, this effect is considerably reduced. Where there is a multiplicity of annuli, each annulus can be further displaced relative to its neighbour, such as to generate, by way or example, a six phase output, so reducing the cogging effect even further. Repeating the process even further, such as in the generator shown in FIG. 7a and having six annuli per stator and seven armature annuli, can, given the benefit of rotary inertia, reduce the effect to a virtually undetectable level. A further variation may comprise the gradual rotary displacement of each stator annulus relative to the preceding annulus to vary the relative phase angle of each by a small degree.

As an alternative to dividing the coils into groups around and within the circumference of an annulus, the annuli may simply be placed in groups around the shaft, as shown at 68, 69 and 70, in FIG. 13, each group being rotationally phased displaced by, for example, 120° relative to its neighbours, to provide a three phase output.

In any of the above cases, the ac generated in each annulus may be rectified to dc current, as shown in FIG. 14, for combining all of the outputs of the various stator annuli for further processing by electronic inverters or the like to an ac voltage level and frequency suitable for transmission to the local grid.

It will be appreciated that the various components of the generator may be exposed to the elements, depending upon the degree of protection afforded. Ferrite magnets, as to be used in this generator, enjoy the benefit of being largely inert to the effects of sea spray or brine (a benefit certainly not enjoyed by rare earth magnets), and so no particular protective measures are required. However, as shown at 71 in FIG. 15, they may be encapsulated in a durable and inert epoxy resin for their ultimate protection. In the case of the stator coils, these may be similarly encapsulated, as shown at 74 in FIG. 16. A further non-magnetic and non conductive facing disc, fabricated for example, from an inert hard plastics, may be adhered to either side of the coils, to provide additional protection, as shown symbolically at 75, ready for adhesion onto the encapsulated coils at 74.

It is common practice in axial flux generators comprising a plurality of rotors for the end rotor of the series to be in the form of a simple ferromagnetic disc, or annulus. This is customarily of the same or similar construction as the other discs comprising the rotor stack. (An example is given in US 2008/0231132). The rotor disc magnets on the end rotor are mounted on its inside surface only, to provide the necessary flux between the said end rotor disc and the next more inner rotor disc facing it. The end rotor disc serves to provide a convenient path to complete the magnetic circuits between the inside faces of the permanent magnets arranged in a north south north south sequence around it.

However, this arrangement is not ideal, as the internal flux density formed in the last gap can tend to diminish, simply as it is the last in a chain of sequential magnetic fields and lateral flux leakage is more prevalent.

According to a feature of the invention, the end rotor assembly of a generator of the invention comprises a first inner end rotor plate, bedecked with permanent magnets on either side of it in the same manner as the other, inner, rotor plates of the generator, and a second outer end rotor plate magnetically in contact with the outer faces of the outer magnets mounted on the outside surface of the first inner end rotor plate.

By this means, magnetic field continuity is provided to the inner magnets, inasmuch as the extra magnets on the outer surface of the inner end plate provide a more powerful means of drawing through the lines of force of the inner magnets, while the outer of the two rotor plates serves as a keeper for the outer magnets as well as providing a favourable reflux path for their alternating NSNS fields further enhancing the magnetic flux strengths.

Experimentation has shown that on average, the flux density increases on average by over 6.5%. However, the flux density in borderline areas, i.e. those around the periphery of the permanent magnets, increases by over 22%. This results in a notable increase in the emfs generated with the coils of the last stator annulus situate in the last gap.

The extra cost of the additional construction, namely the outer permanent magnets and the very outer disc, is quickly met in terms of the extra electricity generated over the lifetime of the generator, and this benefit accrues of course at both ends of the generator.

A specific means of enhancing the magnetic fields present in the end gap of a series of rotors constructed according to the invention, is now shown with reference to FIG. 17.

A first inner rotor disc is shown at 76. Permanent magnets 77 and 78 are mounted in attraction upon both sides of the disc, in the same manner as the more inner rotor discs, such as the one shown facing it at 79.

A further rotor disc, or annulus, 80 of a ferromagnetic material is directly attached to the outer surfaces 81 of the outer magnets 78 (e.g. outer planar halves) of the outer armature annulus carrying magnets. One of the further annuli 80 is attached at each end of the generator to the outermost armature annulus.

The arrangement shown enhances the flux density in the gap 82. This is on account of the fact that the magnets 78 arranged on the outer side of the disc 76 tend to draw lines of flux more favourably across the gap 82. The very external disc 80, serves as a keeper for the outer magnets, and provides a convenient magnetic path to link their respective north and south poles, which even further enhances the field intensity in the last stator gap, 82.

Experimentation shows that the flux in the gap resulting from this arrangement is increased by an average of over 6.5%, while flux around the borders of the inner magnets 77 is increased by over 22%. A notable increase results in the emf generated by the coils of a stator annulus, shown schematically at 83, located in the last gap.

Numerous variations will be apparent to those skilled in the art.

The invention claimed is:

1. A rotary generator formed of an elongate cylindrical series of stator annuli and a coaxial elongate cylindrical series of armature annuli and mounted for relative rotational movement around a common longitudinal axis, the series of stator annuli interleaving the series of armature annuli, and either of the armature/stator annuli having a sequence of coils equally spaced around the common longitudinal axis at a selected pitch, and the other of the armature/stator annuli having a corresponding sequence of permanent magnets of alternating polarity equally spaced around the common longitudinal axis at the selected pitch of the coils, the arrangement being such that lines of magnetic flux passing across an air gap between the magnets in a first of the annuli and the magnets on the next of the annuli cut turns of the coils of the corresponding interleaved coil carrying annulus, and thus induce in the coils electromagnetic forces as the armature is caused to rotate relative to the stator, wherein the permanent magnets of each of the other of the armature/stator annuli are each comprised of two planar halves, each half being oppositely affixed and in attraction to one another on either side of a central ferromagnetic annular disc along a magnet axis nominally parallel to the central longitudinal axis, the disc and the magnets mounted thereon together comprising an armature annulus.

2. A generator according to claim 1 further comprising a turbine rotor adapted to rotate responsive to a selected one of wind or tidal energy, the turbine rotor coupled to the coaxial elongate cylindrical series of armature annuli.

3. The generator of claim 2, further comprising at least one further annulus comprised of a ferromagnetic material which is magnetically in contact with the two planar halves of permanent magnets which are the outer planar halves of the two planar halves of an outermost armature annulus of the series of armature annuli.

4. A generator according to claim 1 wherein each of the stator/armature annuli is self contained, inasmuch that no or substantially no physical magnetic coupling and/or actual magnetic contact is provided between each adjacent pair of the stator annuli or each adjacent pair of the armature annuli.

5. A generator according to claim 1 further comprising first and second coaxial cylinders each having an associated length, wherein the series of stator and armature annuli are respectively affixed circumferentially onto respective exterior and interior surfaces of the respective first and second coaxial cylinders.

6. A generator according to claim 5 wherein the first and second coaxial cylinders are pre-grooved to accept the respective stator and armature annuli.

7. A generator according to claim 5 wherein a selected one of the first or second cylinders is affixed to a bearing system enabling rotation of the selected one of the first or second cylinders relative to a remaining one of the first or second cylinders about the common longitudinal axis.

8. A generator according to claim 1 wherein the permanent magnets each comprise ferrite material.

9. A generator according to claim 1 wherein each of the coils extends about an associated coil axis nominally parallel to the common longitudinal axis, and wherein each of the permanent magnets extends about an associated magnet axis nominally parallel to the common longitudinal axis.

10. A generator according to claim 1 wherein the coils are characterized as circular or near circular/elliptical coils.

11. A generator according to claim 1 wherein the permanent magnets embedded in each pair of armature/stator annuli on opposing sides of a corresponding armature/stator annulus having the coils are axially aligned and have opposing facing polarities to form alternating magnetic fields through which the coils of the corresponding armature/stator annulus pass during relative rotation of the corresponding armature/stator annulus relative to the pair of armature/stator annuli, wherein each of the pair of the armature/stator annuli on opposing sides of the corresponding armature/stator annulus have a first total number of permanent magnets in facing relation to the corresponding armature/stator annulus, and wherein the corresponding armature/stator annulus has second total number of coils equal to the first total number of permanent magnets.

12. A generator according to claim 1 wherein the coils around each annulus are divided into three groups, each group being rotationally displaced to provide a 120° phase angle between the respective outputs of the respective groups.

13. A generator according to claim 1 wherein selected groups of the annuli are angularly displaced relative to remaining groups of the annuli about the common longitudinal axis to achieve selected variations in phase angle between the respective outputs of the selected and remaining groups of the annuli.

14. A generator according to claim 1 wherein the elongate cylindrical series of stator annuli are affixed to a stationary inner cylinder, and the coaxial elongate cylindrical series of armature annuli are affixed to a rotatable outer cylinder which is directly driven by a source of mechanical rotary energy.

15. A generator according to claim 1 wherein either or both of the permanent magnets and coils are respectively encapsulated in a protective resin.

16. A generator according to claim 1 wherein the generator is a direct drive rotary generator.

17. A generator according to claim 1 wherein the sequence of coils is a contiguous or substantially contiguous sequence of coils.

18. A generator according to claim 1 wherein the sequence of permanent magnets are equally spaced around a full 360 degree circumference of the associated armature/stator annuli.

19. A generator according to claim 1 wherein the central ferromagnetic annular disc fully extends between the respective planar halves of the permanent magnets along the magnet axis.

* * * * *